US008241538B2

(12) United States Patent
Lee

(10) Patent No.: US 8,241,538 B2
(45) Date of Patent: Aug. 14, 2012

(54) IMAGE FORMING APPARATUS, DRIVING DEVICE AND DRIVING FRAME THEREOF

(75) Inventor: Jung Jae Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/045,018

(22) Filed: Mar. 10, 2011

(65) Prior Publication Data

US 2011/0163471 A1 Jul. 7, 2011

Related U.S. Application Data

(63) Continuation of application No. 12/254,508, filed on Oct. 20, 2008, now Pat. No. 7,929,883.

(30) Foreign Application Priority Data

Dec. 6, 2007 (KR) ........................ 10-2007-0125979

(51) Int. Cl.
*B29C 45/76* (2006.01)

(52) U.S. Cl. .................... 264/40.5; 264/328.1; 425/150; 425/577

(58) Field of Classification Search ................. 264/40.5, 264/328.1; 425/150, 577
See application file for complete search history.

(56) References Cited

U.S. PATENT DOCUMENTS

| | | | | |
|---|---|---|---|---|
| 4,332,545 | A * | 6/1982 | Cargile | 425/577 |
| 4,750,877 | A * | 6/1988 | McFarlane | 425/577 |
| 4,768,943 | A * | 9/1988 | Honsa | 425/577 |
| 6,167,232 | A * | 12/2000 | Jimenez et al. | 399/367 |
| 6,277,308 | B1 * | 8/2001 | Kiernicki et al. | 264/328.7 |
| 2006/0239716 | A1 | 10/2006 | Kim et al. | |

FOREIGN PATENT DOCUMENTS

| | | |
|---|---|---|
| JP | 10-207157 | 8/1998 |
| JP | 2002-182540 | 6/2002 |
| KR | 10-0636230 | 10/2006 |

OTHER PUBLICATIONS

Machine English language translation of JP 2002-182540, published Jun. 26, 2002.
Korean Office Action Issued on Apr. 12, 2012 in KR Patent Application No. 10-2007-0125979.

* cited by examiner

*Primary Examiner* — Jill Heitbrink
(74) *Attorney, Agent, or Firm* — Stanzione & Kim, LLP

(57) ABSTRACT

An image forming apparatus includes driving device frame having a base plate on which is formed integrally with the base plate one or more supporting shafts for supporting one or more power transmission members that transmit driving power from a driving source to driven bodies of the image forming apparatus.

6 Claims, 9 Drawing Sheets

IMAGE FORMING APPARATUS, DRIVING DEVICE AND DRIVING FRAME THEREOF

CROSS-REFERENCE TO RELATED APPLICATIONS

This application is a continuation application of U.S. application Ser. No. 12/254,508, filed on Oct. 20, 2008now U.S. Pat. No. 7,929,883, which claims benefit of Korean Patent Application No. 10-2007-0125979, filed on Dec. 6, 2007 in the Korean Intellectual Property Office, the disclosure of which is incorporated herein by reference.

BACKGROUND

1. Field of the Invention

The present invention relates to an image forming apparatus, and more particularly, to an image forming apparatus with an improved structure of a driving frame, to which power transmission members are mounted, and a manufacturing method thereof.

2. Description of the Related Art

An image forming apparatus refers to an apparatus that prints an image on a printing medium according to an inputted image signal, and may be, e.g., a printer, a copying machine, a fax machine, a multi-function printer (that has multiple functions of printing, scanning, copying and faxing), or the like.

An image forming apparatus comprises a plurality of driven parts (hereinafter, referred to as “driven bodies”), such as, e.g., rollers, a photosensitive drum, a belt or the like, which may exhibit various movements necessary in carrying out various operations, e.g., conveying printing media or printing an image on the printing medium. The driven bodies are driven by a driving device.

The driving device may include a source of driving force, e.g., a motor, and power transmission members, which transmit the driving force from the driving source to the driven bodies. The power transmission members may include, e.g., gears, couplings and power regulation members.

Generally, the motor and the power transmission members are mounted on a metallic base plate to form a sub-assembled unit. The sub-assembled unit is mounted to an inner surface of the frame of the main body of the image forming apparatus, and transmits driving power to those components requiring motion.

On the base plate are provided a plurality of holes corresponding to mounting positions of the power transmission members, and metallic supporting shafts are fitted in the holes to rotatably support the power transmission members. In order to prevent the supporting shafts from rattling or being separated from the base plate, the metallic supporting shafts may typically be securely fixed to the base plate by caulking or press-fitting. An example of an image forming apparatus having supporting shafts (caulking shafts) secured to the base plate by caulking may be found in, e.g., Japanese Patent Laid-open Publication No. 2002-182540.

Unfortunately, however, the process of installing the supporting shafts in the corresponding holes in the base plate may not be the ideal assembly process in terms of the manufacturability and efficiency.

Further, in order to maintain the proper image quality, the arrangements of the supporting shafts, e.g., the relative distances between the supporting shafts, straightness of the supporting shafts, perpendicularity of the supporting shafts to the base plate, or the like should be ensured during the assembly process and/or maintained in operation. However, a conventional mechanical coupling of the supporting shafts to the base plate, e.g., through caulking or press-fitting, may be limited in ensuring and maintaining such proper arrangement of the shafts.

SUMMARY

Various aspects and/or advantages of the disclosed embodiments will be set forth in part in the description which follows and, in part, will be obvious from the description, or may be learned by practice of the embodiments.

In accordance with an aspect, there is provided driving device frame for supporting one or more power transmission members of an image forming apparatus, the image forming apparatus may have one or more driven bodies disposed within the image forming apparatus, each of the one or more driven bodies being configured to be driven to move based on a driving power from a driving power source, each of the one or more power transmission members being configured to receive the driving power of the driving power source and to convey the received driving power to the respective corresponding one of the one or more driven bodies, the driving device frame may comprise a base plate having integrally formed thereon one or more supporting shafts, each of the one or more supporting shafts being configured to support a respective corresponding one of the one or more power transmission members.

The base plate and the one or more supporting shafts may be formed by injection molding of a plastic material.

At least one of the one or more supporting shafts may include a hollow portion extending in an axial direction of the at least one of the one or more supporting shafts.

The hollow portion may be formed eccentrically with respect to a central axis of the supporting shaft.

The one or more supporting shaft may include at least one supporting shaft that may include a first portion and a second portion having different diameters from each other.

The at least one supporting shaft may further include an intermediary portion provided between the first portion and the second portion, the intermediary portion having a diameter that varies gradually as the inclined portion extends from the first portion to the second portion.

The one or more supporting shaft may include at least one supporting shaft that may include a plurality of cylindrical surfaces and a plurality of inclined surfaces, the plurality of cylindrical surfaces being formed along an outer circumferential surface the at least one supporting shaft, and being spaced apart from each other, and each of the plurality of inclined surfaces being disposed between, and forming an incline with respect to, two adjacent ones of the plurality of cylindrical surfaces.

The driving device frame may further include a reinforcing rib formed integrally with the driving frame to reinforce strength of the base plate.

The reinforcing rib has a honeycomb shape.

In accordance with another aspect, there is provided a driving device of an image forming apparatus, the image forming apparatus having one or more driven bodies disposed within the image forming apparatus, each of the one or more driven bodies being configured to be driven to move based on a driving power from a driving power source, the driving device may comprise: one or more power transmission members disposed in a transmission path of the driving power from the driving power source and a respective corresponding one of the one or more driven bodies, each of the one or more power transmission members being configured to receive the driving power of the driving power source and to convey the received driving power to the respective corresponding one of the one or more driven bodies; and a driving device frame including a base plate having one or more supporting shafts formed integrally thereon, each of the one or more supporting shafts being configured to support a respective corresponding one of the one or more power transmission members.

In accordance with yet another aspect, there is provided an image forming apparatus, which may comprise one or more driven bodies disposed within the image forming apparatus, each of the one or more driven bodies being configured to be driven to move based on a driving power from a driving power source; one or more power transmission members disposed in a transmission path of the driving power from the driving power source and a respective corresponding one of the one or more driven bodies, each of the one or more power transmission members being configured to receive the driving power of the driving power source and to convey the received driving power to the respective corresponding one of the one or more driven bodies; and a driving device frame including a base plate having one or more supporting shafts formed integrally thereon, each of the one or more supporting shafts being configured to support a respective corresponding one of the one or more power transmission members.

The image forming apparatus may further comprise a paper feeding device configured to convey a paper; a printing device configured to receive the paper from the paper feeding device, and to print an image on the received paper; and a paper discharge device configured to discharge the paper on which the image is formed outside of the image forming apparatus, wherein the one or more driven bodies is disposed in, and operates as a component of, at least one of the paper feeding device, the printing device and the paper discharge device.

BRIEF DESCRIPTION OF THE DRAWINGS

These and/or other aspects and advantages of the exemplary embodiments of the invention will become apparent and more readily appreciated from the following description of the embodiments, taken in conjunction with the accompanying drawings, of which.

DETAILED DESCRIPTION OF THE EMBODIMENTS

Figure 1:
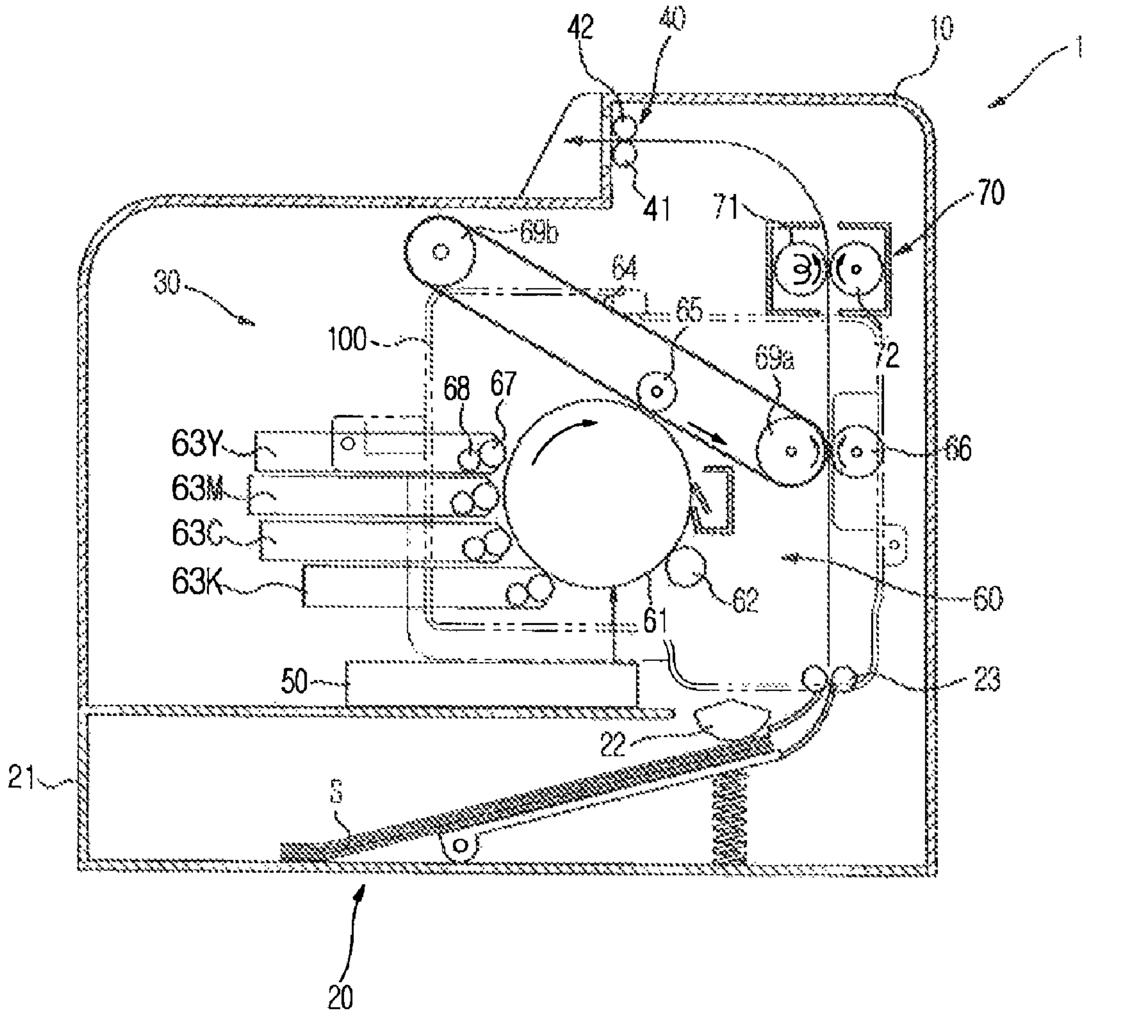
FIG. 1 is a view showing constitution of the relevant portions of an example image forming apparatus according to one embodiment of the present invention.

Reference will now be made in detail to various embodiments of the present invention, examples of which are illustrated in the accompanying drawings, wherein like reference numerals refer to like elements throughout.

FIG. 1 is a view showing relevant portions of an image forming apparatus according to an embodiment. As shown in FIG. 1, an image forming apparatus 1 according may include a main body 10, a paper feeding device 20, a printing device 30, a paper discharge device 40 and a driving device 100. The paper feeding device 20 may hold therein a supply of paper, and conveys the paper to the printing device 30. The printing device 30 prints an image on the conveyed paper. The paper discharge device 40 discharges the printed paper out of the main body 10. The driving device 100 drives various driven bodies, which may be provided in various places of the image forming apparatus, for example, in the paper feeding device 20, the printing device 30 and/or the paper discharge device 40.

The printing device 30 may vary widely depending on the type of the printing employed and/or the features of the image forming apparatus. The image forming apparatus shown in this example is configured as an electro-photographic type color image forming apparatus, however, the scope of the application of the embodiment described herein should not be so limited, and rather is equally applicable to image forming apparatus employing other types of printing techniques. According to the example, the printing device 30 may include a laser scanning unit 50, which may scan light corresponding to image information on the surface of a photosensitive drum 61 to form an electrostatic latent image thereon, a developing unit 60, which may develop the electrostatic latent image into a visible image, and which may transfer the visible image onto the paper, and a fusing unit 70, which may fix the visible the image on the paper by, e.g., applying heat and/or pressure.

The paper feeding device 20 may include a paper feeding cassette 21 to support the paper S, a pickup roller 22 to pick up the paper S from the paper feeding cassette 21 sheet by sheet, and a feeding roller 23 to feed the picked-up paper toward the developing unit 60.

The developing unit 60 may include the aforementioned photosensitive drum 61, a charge roller 62 that may charge the photosensitive drum 61, four developing devices 63Y, 63M, 63C and 63K, which respectively develop the electrostatic latent image formed on the photosensitive drum 61 into a visible image using toner of a color, e.g., yellow, magenta, cyan and black, an intermediate transfer belt 64, a first transfer roller 65 and a second transfer roller 66.

Each of the developing devices 63Y, 63M, 63C and 63K may include a developing roller 67 to develop the electrostatic latent image formed on the photosensitive drum 61 into the toner image by supplying the toner to the electrostatic latent image, and a supply roller 68 to supply the toner to the developing roller 67.

The intermediate transfer belt 64 is supported by a belt driving roller 69*a* and a tension roller 69*b*, and may run in synchronization with the rotation of the photosensitive drum 61. The first transfer roller 65 may oppose the photosensitive drum 61, and may thus transfer the toner image developed on the photosensitive drum 61 onto the intermediate transfer belt 64.

The second transfer roller 66 may opposes the belt driving roller 69*a* while the intermediate transfer belt 64 being interposed therebetween. While the toner image is being transferred onto the intermediate transfer belt 64 from the photosensitive drum 61, the second transfer roller 66 may remain spaced apart from the intermediate transfer belt 64 until the toner image is completely transferred onto the intermediate transfer belt 64, at which time the second transfer roller 66 may come into a pressing contact with the intermediate transfer belt 64 at a predetermined pressure to transfer the toner image on the intermediate transfer belt 64 onto the paper.

The fusing unit 70 may include a heating roller 71 having a heat source therein, and a press roller 72 pressing the heating roller 71 with a predetermined pressure. The image transferred on the paper is fused to the paper by heat transferred from the heating roller 71 and/or the pressure applied between the heating roller 71 and the press roller 72.

The paper discharge device 40 may include a discharge roller 41 to feed the paper passing through the fusing unit 70 to the outside of the main body 10, and a discharge backup roller 42 rotating in cooperation with the discharge roller 41.

The operation of the above described example of an image forming apparatus will now be briefly explained. The laser scanning unit 50 may irradiates light corresponding to, e.g., the yellow image information to the photosensitive drum 61, which was charged to a uniform electric potential by the charge roller 62, forming an electrostatic latent image corresponding to the yellow image is formed on the photosensitive drum 61. A developing bias may be applied to the developing roller 67 of the yellow developing device 63Y, and the yellow toner is applied to the electrostatic latent image to develop the electrostatic latent image into a yellow toner image on the photosensitive drum 61. The toner image may then be transferred onto the intermediate transfer belt 64 by the first transfer roller 65.

Once the yellow toner image corresponding to a page is completely transferred, the laser scanning unit 50 may scans light corresponding to another color, e.g., the magenta image information, to the photosensitive drum 61 to form an electrostatic latent image corresponding to the magenta image. The magenta developing device 63M supplies the magenta toner to the electrostatic latent image to develop the electrostatic latent image into a magenta toner image. The magenta toner image formed on the photosensitive drum 61 is transferred onto the intermediate transfer belt 64, and overlaps the yellow toner image which has been previously transferred.

Thereafter, the toner images of cyan and black are sequentially transferred onto the intermediate transfer belt 64 in the similar manner as described above, resulting in the full color toner image being formed on the intermediate transfer belt 64 with the toner images of yellow, magenta, cyan and black being overlapped with each other. The color toner image may then be transferred onto the paper passing between the intermediate transfer belt 64 and the second transfer roller 66. The image transferred onto the paper may be fused to the paper by the heat and/or pressure as the paper passes through the fusing unit 70, and the paper having passed through the fusing unit 70 is discharged outside by the discharge roller 41. While a particular sequence of forming the each of the color images is described above for illustrative purpose only, it should be readily apparent that the different color images can be formed in any sequence, and that the scope of the application of the embodiment described herein is not limited to any particular order of color image formation.

Driven bodies provided in the various devices and units described above, such as, e.g., the pickup roller 22, the photosensitive drum 61, the developing roller 67, the belt driving roller 69*a*, the second transfer roller 66, the heating roller 71 and the discharge roller 41, may be driven by the driving device 100. The driving device 100 may be mounted to a side surface of a frame (not shown) provided in the main body 10.

Figure 2:
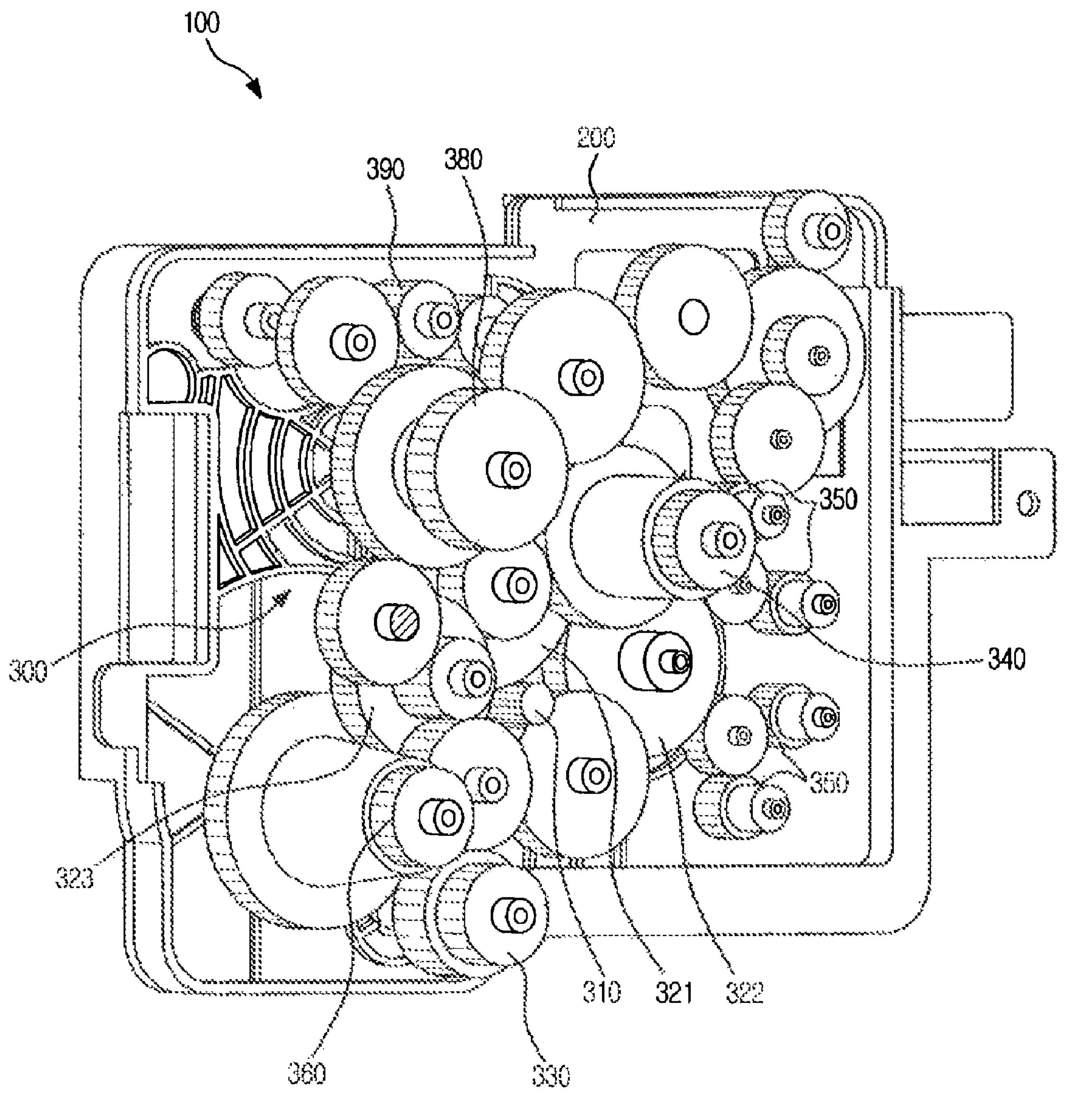
FIG. 2 is a perspective view showing constitution of an example driving device according to an embodiment of the present invention.

FIG. 2 is shows an example of a driving device 100, which may include a driving frame 200, a driving source, e.g., a motor (not shown), power transmission members 300 to transmit driving power from the driving source to the driven bodies, and a power regulation device (not shown) to regulate the driving power transmitted, and/or the timing thereof, to the various driven bodies, including, e.g., the four developing devices 63Y, 63M, 63C and 63K.

The power transmission members 300 may be rotatably mounted on one side, e.g., the front side, of the driving frame 200, and the driving source may be mounted on the opposite side, e.g., the back side, of the driving frame 200. A driving source shaft 310 of the driving source may extended to the front surface of the driving frame 200, and may engaged with one or more power transmission gears, e.g., for example, the first to third power transmission gears 321, 322 and 323 as shown in FIG. 2.

The power regulation device (not shown) may be mounted to the back side of the driving frame 200. The power regulation device may include, e.g., a spring clutch, a cam shaft, a solenoid, and/or the like that allows selective transmission of the driving power from the driving source to the various driven bodies, e.g., the four developing devices 63Y, 63M, 63C and 63K. Any such known power regulation device may be used in connection with the various embodiments of image forming apparatus described herein. One example of such a power intermittent device may be found in US Patent Application Publication No. US 2006/0239716 to Kim et al., entitled "image Forming Apparatus," the disclosure of which is incorporated by reference herein in its entirety.

The power transmission members 300 may include one or more of the paper feeding device driving gear 330 for transmitting the driving power to the paper feeding device 20, the drum driving gear 340 for transmitting the driving power to the photosensitive drum 61, the four developing device driving gears 350 for respectively transmitting the driving power to the four developing devices 63Y, 63M, 63C and 63K, the belt driving gear 360 for transmitting the driving power to the intermediate transfer belt 64, a transfer roller driving gear (not shown) for transmitting the driving power to the second transfer roller 66, the fusing unit driving gear 380 for transmitting the driving power to the fusing unit 70, and the discharge device driving gear 390 for transmitting the driving power to the paper discharge device 40.

In this example, the first power transmission gear 321 may transmit the driving power to the drum driving gear 340 and the belt driving gear 360 through a series of gear trains. The second power transmission gear 322 may transmit the driving power to the developing rollers 67 and the power intermittent device through a series of gear trains. The third power transmission gear 323 may transmit the driving power to the paper feeding device driving gear 330, the transfer roller driving gear (not shown), the fusing unit driving gear 380 and the discharge device driving gear 390 through a series of gear trains.

Figure 3:
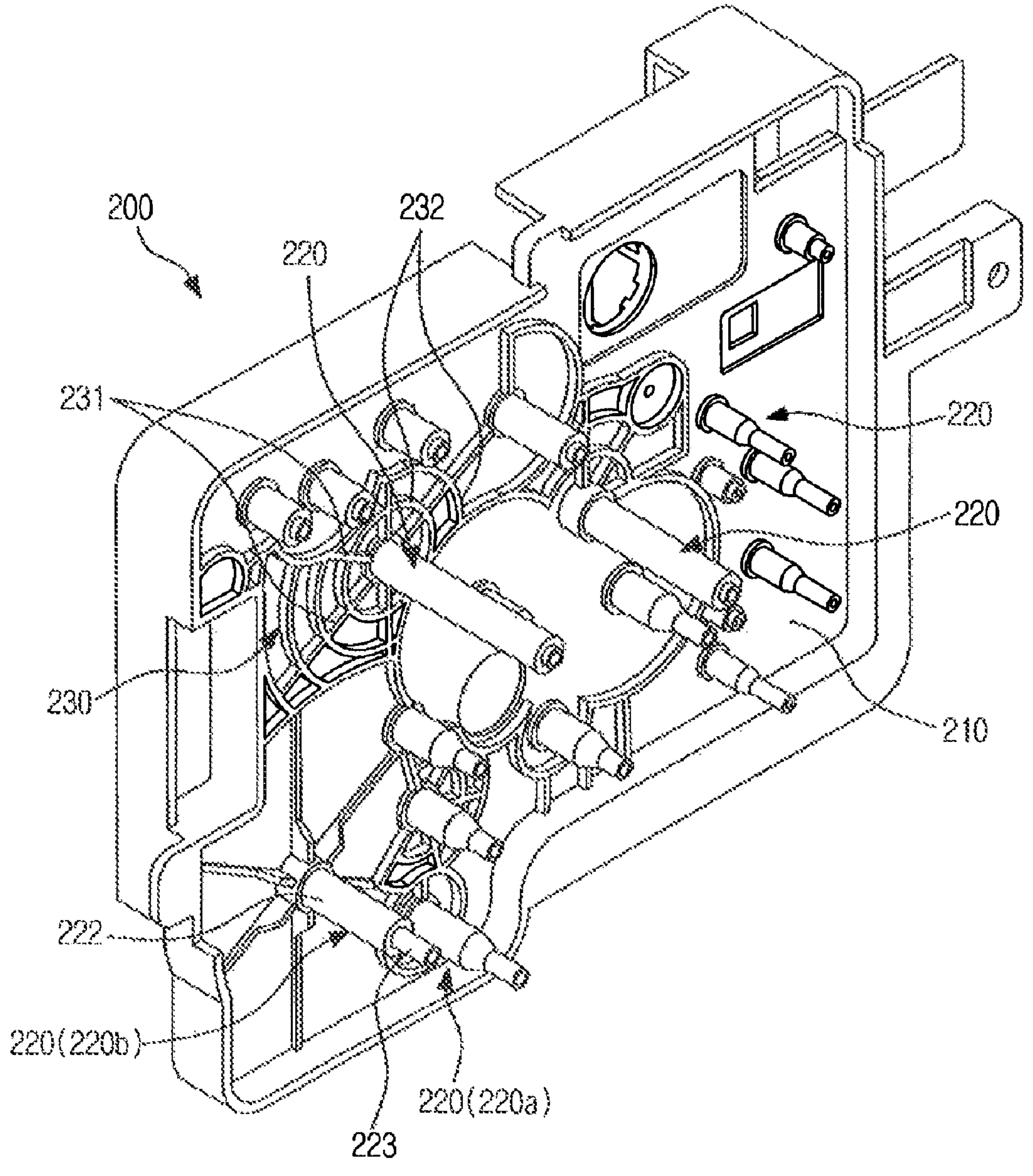
FIG. 3 is a perspective view showing a driving frame of the driving device depicted in FIG. 2.
Figure 4:
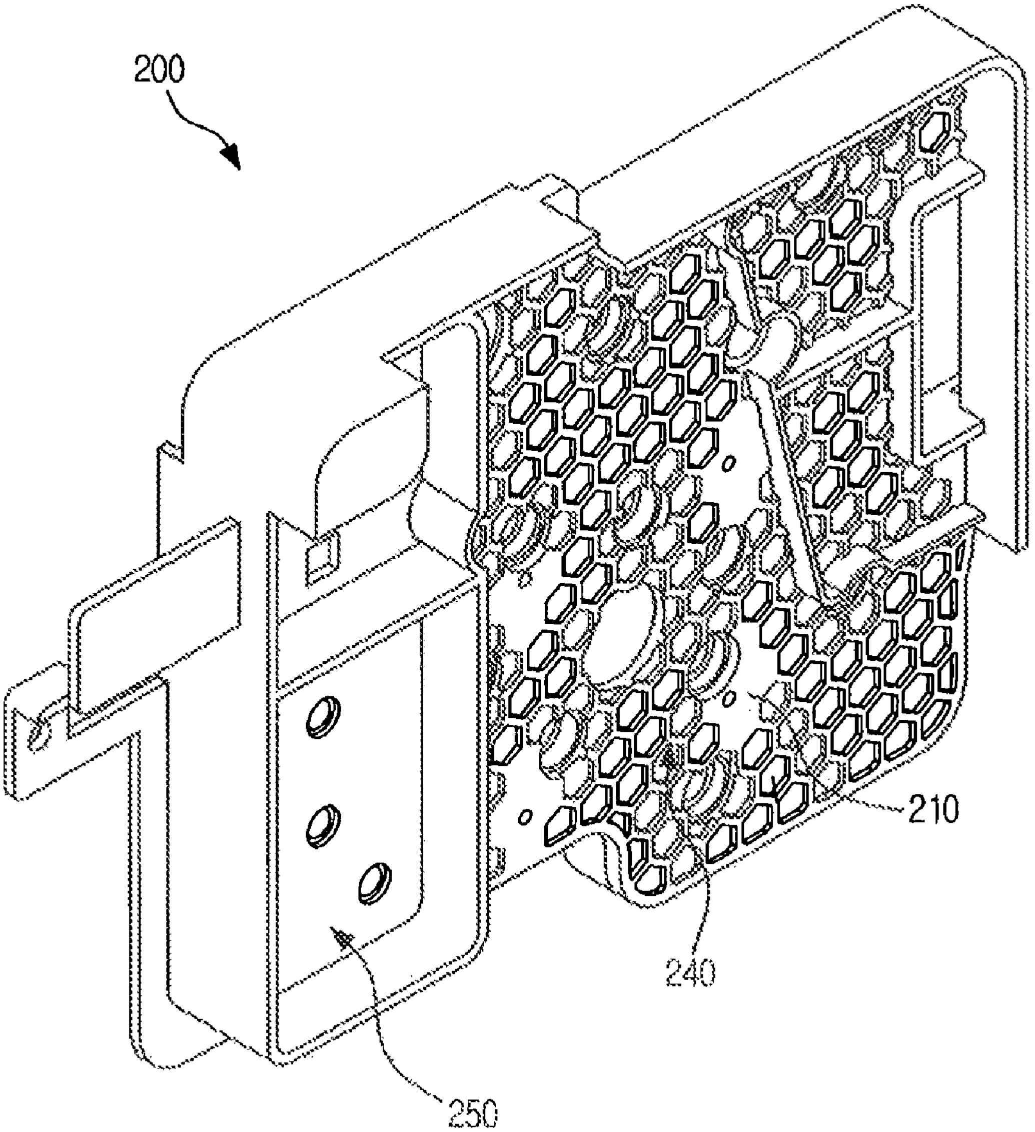
FIG. 4 is perspective view of the driving frame depicted in FIG. 3 observed from the other side.

FIG. 3 shows the front side of the driving frame of the driving device depicted in FIG. 2. FIG. 4 shows the back side of the driving frame. In FIG. 3, only relevant portions of supporting shafts are denoted by reference numerals.

As shown in FIGS. 3 and 4, the driving frame 200 may include a base plate 210, and supporting shafts 220 for supporting the various power transmission members 300.

According to the embodiment, the supporting shafts 220 may be formed integrally with the base plate 210, obviating the need for the additional processes of coupling the separately formed supporting shafts 220 to the base plate 210, which may simplify the assembly process. In addition, by providing the integrally formed supporting shafts 220, it may be possible to reduce the misalignments between the supporting shafts and/or tilting of the supporting shafts, which may have resulted during the process of coupling separately formed supporting shafts 220 to the base plate.

The driving frame 200 may be formed by injection molding of a high functional plastic material. For example, the driving frame 200 may be made of modified polyphenylene oxide (MPPO) having low molding contraction and high dimension stability features.

Figure 5:
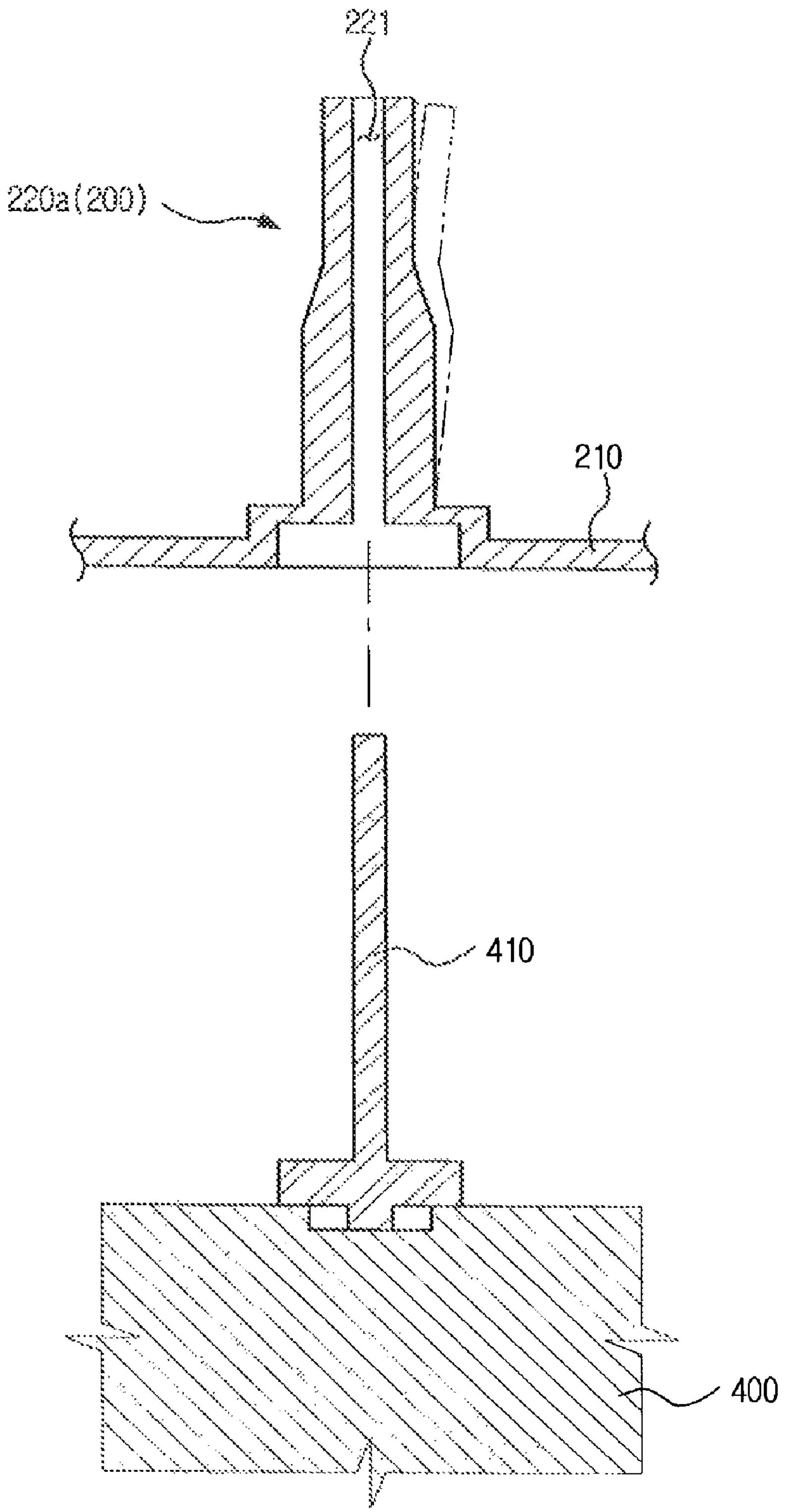
FIG. 5 is a sectional view of a supporting shaft of the driving frame according to an embodiment.
Figure 6:
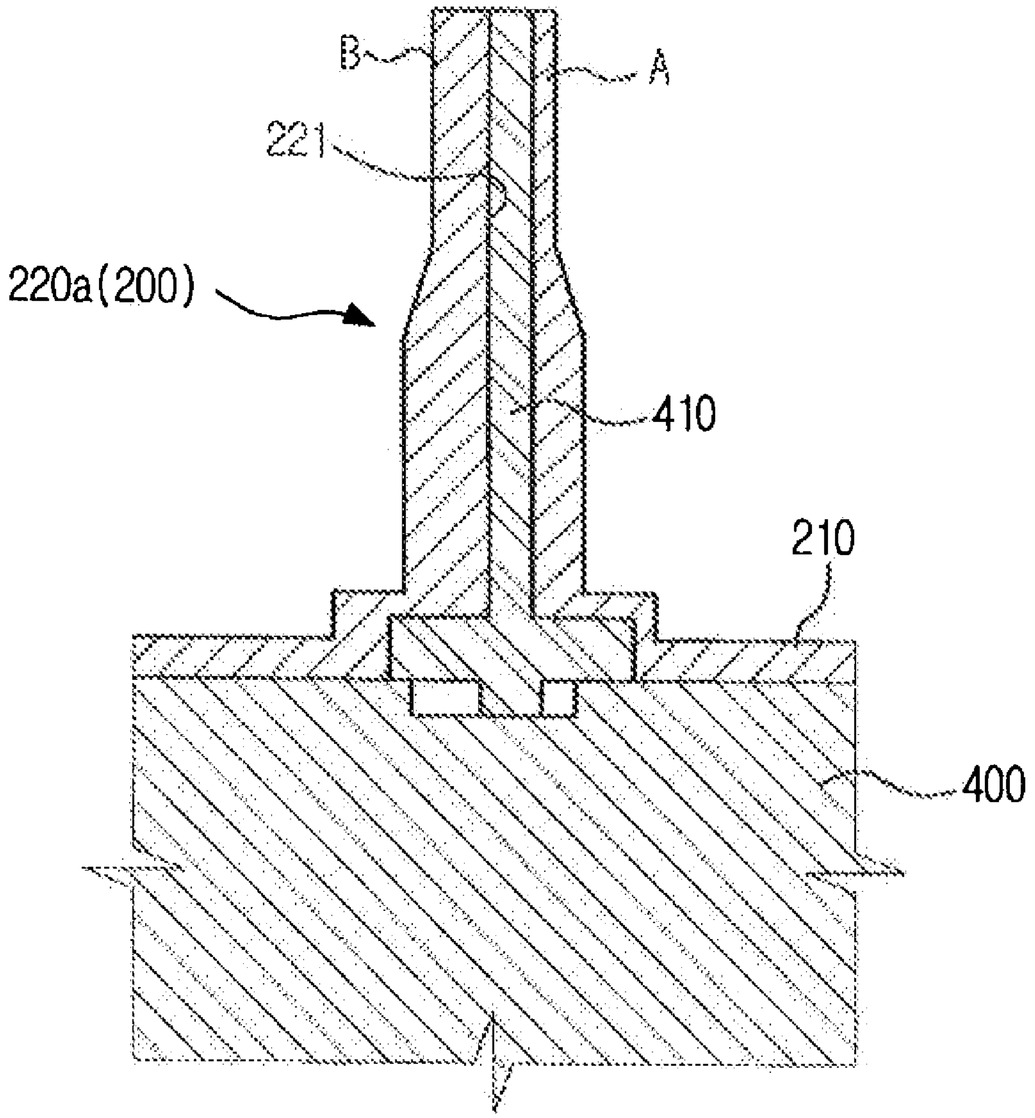
FIG. 6 is a view to illustrate an adjustment of perpendicularity of the supporting shaft according to an embodiment.

FIG. 5 is a sectional view of a supporting shaft 220 of the driving frame shown in FIG. 3. FIG. 6 illustrates an example of an adjustment of the tilt angle or the degree of perpendicularity of a supporting shaft with respect to the base plate. For the sake of brevity, of the various supporting shafts 220, a supporting shaft 220*a* supporting the paper feeding device driving gear 330 (refer to FIG. 2) will be used as an example in the explanation hereinafter, the explanation of which may be applicable to other supporting shafts as well.

As shown in FIGS. 5 and 6, and in this embodiment, the supporting shaft 220*a* may have a hollow portion 221 formed along the axial direction of the supporting shaft 220*a*. With such hollow shaft configuration, it may be possible to realize a sufficient strength with lesser amount of material.

The hollow portion 221 of the supporting shaft 220*a* may be formed by an adjusting pin 410 provided at an injection mold 400. The adjusting pin 410 may be mounted to the mold 400 so that the adjusting pin 410 may move in the horizontal direction allowing the position of the adjusting pin 410 to be adjusted.

While the driving frame 200 may be formed by molding a material having high dimension stability, particularly when the length of the supporting shaft 220*a* becomes exceedingly large, it may be still possible that the supporting shaft 220*a* may contract, warp and/or bend during the process of cooling the driving frame 200 after the molding. In accordance with an embodiment, deviations of the perpendicularity of the supporting shaft 220*a* may be compensated by adjusting the position of the hollow portion 221.

For example, if the supporting shaft 220*a* becomes bent right during the process of cooling the driving frame 200, e.g., slightly to the right as illustrated by the imaginary line in FIG. 5, in. Such occurrence may be detected by, e.g., sampling and inspecting the driving frame 200 prior to mass production or with a regular interval after the design of the mold.

In the above example, the perpendicularity of the supporting shaft 220*a* may be compensated by slightly moving to the right the adjusting pin 410 corresponding to the supporting shaft 220*a* as shown in FIG. 6.

When the adjusting pin 410 is so moved to the right, as shown in FIG. 6, the hollow portion 221 of the supporting shaft 220*a* may be formed eccentrically right with respect to the center of the supporting shaft 220*a*, making the right portion A of the supporting shaft 220*a* to be thinner than the left portion B.

When cooled down after molding, the thicker portion B of the supporting shaft 220*a* may contract more than the thinner portion A. Based on such difference in contraction, which has the tendency to result in the right-bending of the supporting shaft 220*a* being corrected, the supporting shaft 220*a* may be formed to have the proper perpendicularly with respect to the base plate 210. While, for convenience of explanation, compensating of the right-bending of the supporting shaft has been explained with reference to FIGS. 5 and 6, however, the compensation may also be made in other bending directions of the supporting shaft, in a manner similar to the above, based on the same principle.

Figure 7:
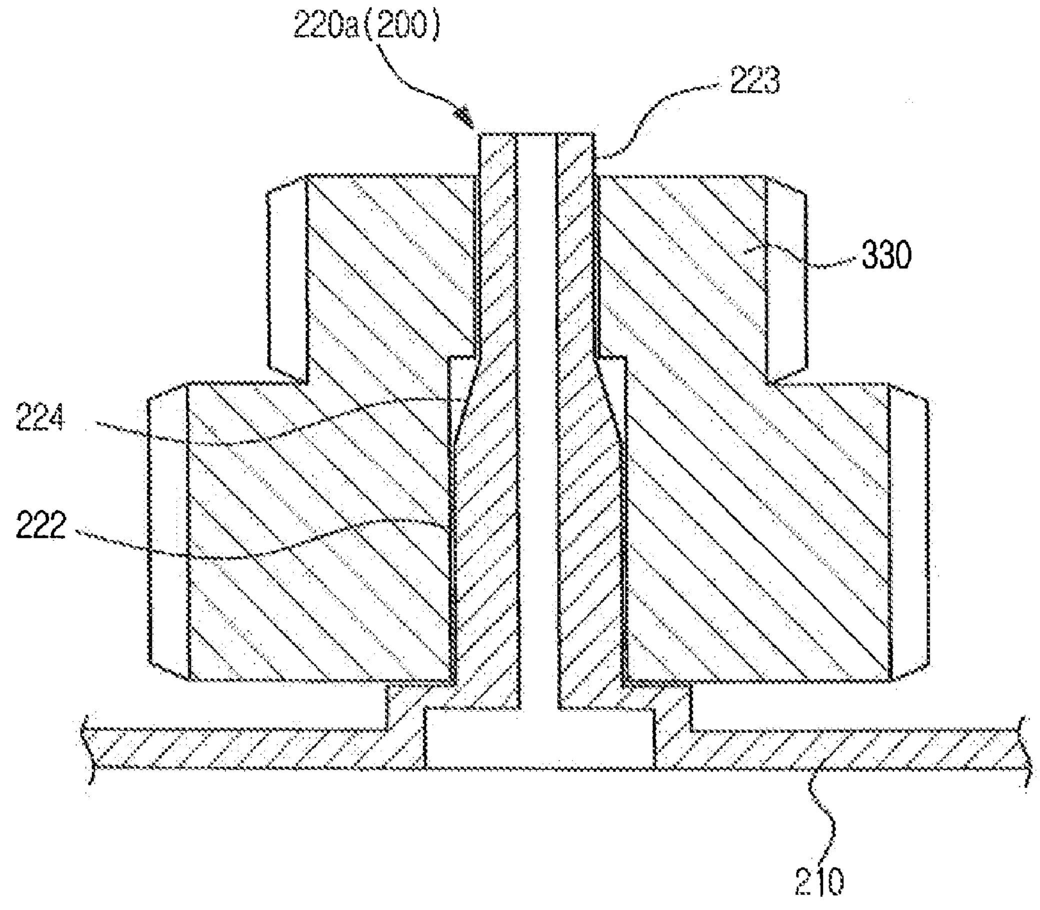
FIG. 7 is a sectional view showing the supporting shaft and a power transmission member mounted to the supporting shaft according to an embodiment.

FIG. 7 show a sectional view of a supporting shaft and a power transmission member mounted thereto. In order to prevent the power transmission member, e.g., the paper feeding device driving gear 330, from rattling on the supporting shaft 220*a*, an outer surface of the supporting shaft 220*a* may be formed substantially straight in the axial direction of the supporting shaft 220*a*. In some cases, however, the injection molding process may cause irregularities that may prevent the formation of the supporting shaft 220*a* to be straight with a substantially constant diameter, particularly when the length of the supporting shaft 220*a* becomes large.

In one embodiment, and to address the above problem, as shown in FIGS. 3 and 7, the supporting shaft 220*a* may be formed with a first portion 222 and a second portion 223, which have different diameters from each other. The first portion 222 may be the portion, which extends from the base plate 210 in the axial direction, and which may be formed to have a larger diameter than the second portion 223, in order to maintain rigidity of the supporting shaft 220*a*. The second portion 223 may be formed coaxially with the first portion 222, and may extend from the first portion 222 in the axial direction.

According to an embodiment, the supporting shaft 220*a* may be additionally include an inclined portion 224 formed between the first portion 222 and the second portion 223, so that the diameter of the supporting shaft 220*a* is gradually decreased from the first portion 222 to the second portion 223. In an embodiment, for increased rigidity of the supporting shaft 220*a*, the inclined portion 224 may serve to prevent an abrupt change in the diameter of the supporting shaft 220*a*. However, it is also possible to form the first portion 222 and the second portion 223 with a stepped portion therebetween (as illustrated by, e.g., the supporting shaft 220*b* shown in FIG. 3, which supports the belt driving gear 360).

As shown in FIG. 7, when the paper feeding device driving gear 330 is mounted to the supporting shaft 220*a*, the first portion 222 and the second portion 223 of the supporting shaft 220*a* may rotatably support the paper feeding device driving gear 330 while the inclined portion 224 of the supporting shaft 220*a* may be spaced apart from the paper feeding device driving gear 330.

For convenience, the above explanation is made using as example the hollow portion 221, the first portion 222, the second portion 223 and the inclined portion 224 with reference to the supporting shaft 220*a* supporting the paper feeding device driving gear 330. However, some or all of the other supporting shafts 220 may also be formed to have the hollow portion 221 and/or the inclined portion 224. When, e.g., a supporting shaft has a length than exceeds four to five times its diameter, it may be preferable to include the aforementioned inclined portion 224 for such supporting shaft.

Figure 8:
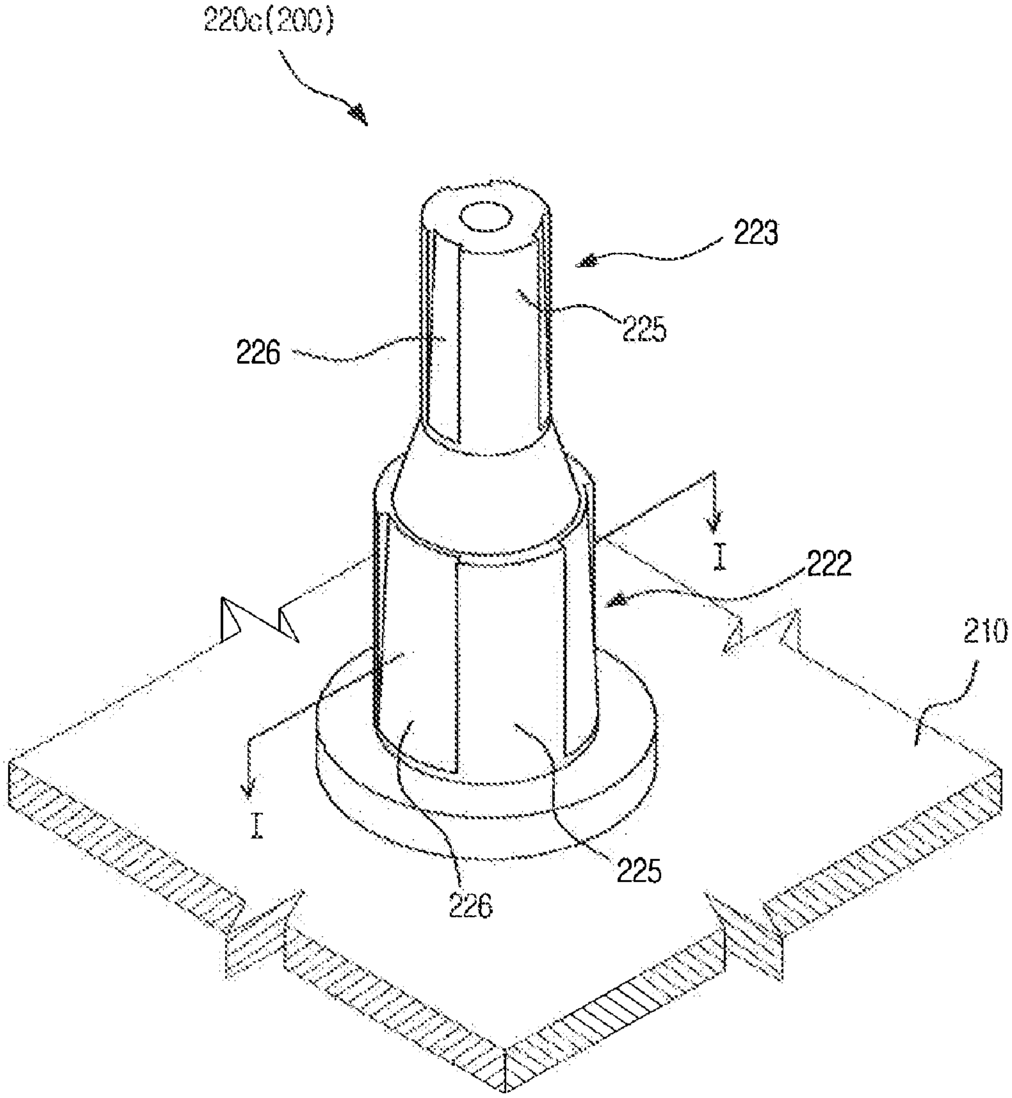
FIG. 8 is a perspective view showing an example of the supporting shaft according to another embodiment.
Figure 9:
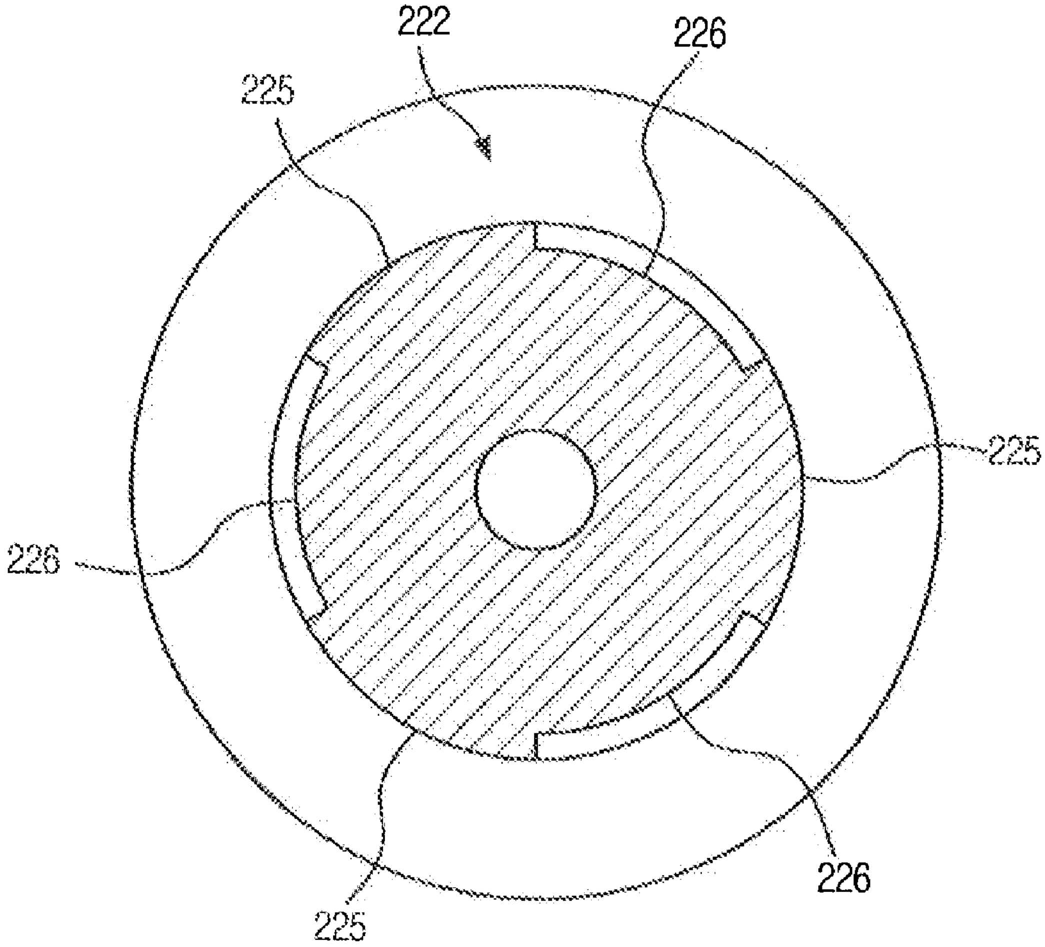
FIG. 9 is a sectional view taken along line I-I in FIG. 8.

FIG. 8 shows a perspective view of another example of the supporting shaft while FIG. 9 is a sectional view taken along line I-I of FIG. 8. As previously described, to reduce rattling of the power transmission member on the supporting shaft 220, it is desirable to form the portion of the supporting shaft 220 that supports the power transmission member 300 as a straight cylindrically shape. However, it may in some instances be difficult during the injection molding of the supporting shaft 220 integral with the base plate 210 to form a straight cylindrical shape of the supporting shaft 220.

In the embodiment of FIGS. 8 and 9, the portions of the supporting shaft 220*c* that supports the power transmission member (not shown), i.e., the first portion 222 and the second portion 223 may be provided with a modified shape. As shown, the first portion 222 and the second portion 223 of the supporting shaft 220*c* may respectively include cylindrical surfaces 225, which may be formed along the circumference of the supporting shaft 220*c*, and inclined surfaces 226, which may be formed between the adjacent cylindrical surfaces 225. The inclined surfaces 226 may be formed to be inclined inwardly with respect to the supporting shaft 220_c_ as the inclined surface 226 extend away from the base plate 210.

In order to support the power transmission member with proper balance, the cylindrical surfaces 225 may be provided to be spaced apart from each other in the circumferential direction of the supporting shaft 220_c_ while the inclined surfaces 226 may be arranged between the adjacent cylindrical surfaces 225.

When the supporting shaft 220_c_ is formed as described above, the need to form a precise cylindrical shape may be lessened.

As shown in FIGS. 3 and 4, the driving frame 200 may have a strength reinforcing portion which are formed integrally with the base plate 210. The strength reinforcing portion serves to reinforce strength of the base plate 210 and thereby to prevent the base plate 210 from being deformed due to the load transmitted through the supporting shaft 220.

The strength reinforcing portion may include a first reinforcing rib 230 and a second reinforcing rib 240, which are formed on the front surface and the rear surface of the base plate 210, respectively. As shown in FIG. 3, the first reinforcing rib 230 may be formed around the supporting shaft 220, on which the load may relatively be concentrated. The first reinforcing rib 230 may include radial rib portions 231, which extend in radial direction from the supporting shaft 220, and circumferential rib portions 232, which may be formed to extend in the circumferential direction around the supporting shaft 220, and which may connect the radial rib portions 231. As shown in FIG. 4, the second reinforcing rib 240 may be formed in a honeycomb shape. The second reinforcing rib 240 may be formed over a broad region of the rear surface of the base plate 210, so as to increase the overall strength reinforcement of the base plate 210.

Also as shown in FIG. 4, a power regulation device mounting portion 250 may be formed integrally with the driving frame 200. The power regulation device mounting portion 250 may be provided for mounting therein a power regulation device (e.g., an example of which may be found in the US Patent Application Publication No. US 2006/0239716) to selectively transmit driving power from the driving source (not shown) to, e.g., the four developing devices 63Y, 63M, 63C and 63K. As such, if the power regulation device mounting portion 250 is formed integrally with the driving frame 200, the power regulation device may be directly mounted to the driving frame 200 without requiring an additional fixing member, making it possible to realize additional reduction of the manufacturing costs.

Although embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method for manufacturing a driving device frame for an image forming apparatus including a plastic base plate, and at least one plastic supporting shaft formed integrally with the base plate to support at least one power transmission member, the method comprising:

preparing an injection mold having at least one adjusting pin to form a hollow portion extending axially in the at least one supporting shaft;

forming a molded product using the injection mold;

inspecting the molded product, thereby detecting verticality of the at least one supporting shaft; and moving the at least one adjusting pin of the injection mold when the detected verticality of the at least one supporting shaft is outside a tolerance range, thereby adjusting the verticality of the at least one supporting shaft, wherein the detecting verticality of the at least one supporting shaft includes detecting an inclination direction of the supporting shaft with regard to a direction perpendicular to the base plate.

2. The method according to claim 1, wherein the moving the at least one adjusting pin of the injection mold includes moving the adjusting pin in the inclination direction of the supporting shaft.

3. The method according to claim 1, wherein the adjusting pin of the injection mold is moved such that the hollow portion of the supporting shaft is formed eccentrically with respect to a central axis of the supporting shaft.

4. The method according to claim 1, wherein the at least one supporting shaft includes first and second portions of substantially different thicknesses extending from an inner surface of the hollow portion to an outer surface of the supporting shaft.

5. The method according to claim 1, wherein the at least one supporting shaft includes first and second portions having substantially different diameters from each other.

6. The method according to claim 5, wherein:

the first portion of the supporting shaft has a larger diameter than the second portion; and the second portion is formed coaxially with the first portion, and extends axially from the first portion.

* * * * *